(12) United States Patent
Elliott

(10) Patent No.: US 9,041,321 B1
(45) Date of Patent: May 26, 2015

(54) PWM CONTROL OF VIBRATION MOTORS FOR MOBILE ELECTRONIC DEVICES

(71) Applicant: CASE-MATE, INC., Tucker, GA (US)

(72) Inventor: David Andrew Elliott, Atlanta, GA (US)

(73) Assignee: CASE-MATE, INC., Tucker, GA (US)

( * ) Notice: Subject to any disclaimer, the term of this patent is extended or adjusted under 35 U.S.C. 154(b) by 0 days.

(21) Appl. No.: 14/320,123

(22) Filed: Jun. 30, 2014

(51) Int. Cl.
H02P 7/00 (2006.01)
H02P 25/02 (2006.01)

(52) U.S. Cl.
CPC .................................... *H02P 25/027* (2013.01)

(58) Field of Classification Search
USPC ........................................................ 318/114
See application file for complete search history.

(56) References Cited

U.S. PATENT DOCUMENTS

| | | | |
|---|---|---|---|
| 5,034,674 A | 7/1991 | Sato | |
| 6,435,160 B2 | 8/2002 | Round et al. | |
| 6,750,622 B2 | 6/2004 | Simizu et al. | |
| 7,133,601 B2 | 11/2006 | Phillips et al. | |
| 8,294,424 B2 | 10/2012 | Bucur | |
| 2006/0043933 A1 | 3/2006 | Latinis | |
| 2007/0114956 A1* | 5/2007 | Hashimoto | 318/139 |
| 2008/0079592 A1 | 4/2008 | Latinis | |
| 2009/0295313 A1* | 12/2009 | Suzuki et al. | 318/139 |
| 2010/0141185 A1* | 6/2010 | Benning et al. | 318/139 |
| 2010/0270955 A1* | 10/2010 | Yamakawa et al. | 318/139 |
| 2011/0062913 A1* | 3/2011 | Lin et al. | 320/101 |
| 2012/0251975 A1* | 10/2012 | Iwahori | 433/119 |
| 2012/0253716 A1 | 10/2012 | Tsuchiya et al. | |
| 2013/0193004 A1* | 8/2013 | Scheffler et al. | 205/785.5 |
| 2013/0307450 A1 | 11/2013 | Fuller et al. | |

* cited by examiner

*Primary Examiner* — Kawing Chan
(74) *Attorney, Agent, or Firm* — Gardner Groff Greenwald & Villanueva, PC

(57) ABSTRACT

An improved vibration motor controller and method maintains a substantially consistent vibration over time, despite decreasing battery voltage over time, with the controller used in a mobile communication device, the mobile communication device powered by a battery having a maximum charge voltage and a minimum charge voltage, the controller being operative for monitoring the available voltage at the battery; driving the vibration motor using pulse width modulation with a motor voltage which is less than the minimum charge voltage of the battery; and controlling the pulse width modulation used to drive the vibration motor in a manner to provide a substantially consistent power level despite fluctuations in voltage of the battery.

15 Claims, 5 Drawing Sheets

DutyCycle(%) = $T_{ON}/T_{PERIOD}$ * 100%
$V_{MOTOR}$ = DutyCycle * (Power Supply Voltage)
Vibration Strength = Max Vibration * DutyCycle Adaptive Feedback Control of PWM Settings Adaptive Feedback Control of PWM Flowchart

PWM CONTROL OF VIBRATION MOTORS FOR MOBILE ELECTRONIC DEVICES

TECHNICAL FIELD

The present invention relates generally to the field of mobile electronic devices, such as cell phones, portable digital assistants, tablets, and related items, and more particularly to a method and apparatus for controlling a vibratory motor in such devices.

BACKGROUND

In general, a common function for a mobile communication device is a call-receiving function. The call-receiving function indicates call-receiving most frequently via a melody mode for producing sound and a vibration mode for shaking (vibrating) the device to alert the user silently about the incoming call or other event. The vibration typically is provided by a small-sized vibration motor to transfer a vibrating force to a housing of the device, by which the device vibrates. While such vibrations are typically found in the device itself, such can be provided in an accessory case housing the device. Examples of the most common vibration motors include cylinder and pancake type motors.

For example, U.S. Pat. No. 7,446,445 of Huang discloses vibration motors and electronic devices utilizing the same. The '445 Patent describes that the vibration motor is disposed in a housing to abut the housing. A first case is disposed in the housing. A second case is combined with the first case. A magnet and a rotor are disposed between the first and second cases. A shaft passes through the magnet, the rotor, and the second case, and is rotatably disposed on the first case. A weight is exposed by the second case, and connected to the shaft passing through the second case. The weight rotates along with the shaft to generate vibration. The vibration of the weight is transmitted to the housing.

Further, as battery life in the mobile communication device diminishes between charges, the vibration can be adversely affected. In short, the vibration degrades as available power to the vibratory motor decreases, as is typical between charges of the battery. It would be advantageous and/or desirable to be able to provide a relatively constant and/or consistent vibration despite variations in battery voltage.

Accordingly, it can be seen that a need exists for a method and apparatus for controlling a vibration motor for a mobile communication device, so as to provide a substantially consistent vibration despite fluctuations in voltage of the battery. It is to the provision of such a method and apparatus that the present invention is primarily directed.

SUMMARY

In example embodiments, the present invention provides an improved vibration motor control so as to maintain a substantially consistent vibration over time, despite decreasing battery voltage over time.

In a first preferred aspect, the invention relates to a method for controlling a vibration motor for a mobile communication device, the mobile communication device powered by a battery having a maximum charge voltage and a minimum charge voltage, the method comprising the steps of: monitoring the available voltage at the battery; driving the vibration motor using pulse width modulation with a motor voltage which is less than the minimum charge voltage of the battery; and controlling the pulse width modulation used to drive the vibration motor in a manner to provide a substantially consistent power level despite fluctuations in voltage of the battery.

Preferably, the vibration motor is chosen to have a motor voltage which is substantially less than the minimum charge voltage of the battery. Also preferably, the motor voltage is applied by using pulse width modulation to reduce the battery voltage to the required motor voltage.

Optionally, the step of applying the pulse width modulation to reduce the battery voltage is carried out according to the following formula: Duty Cyle=Vm÷Vb, where Vm is the motor voltage, Vb is the present battery voltage, and Duty Cycle is the duty cycle of the pulse width modulation. Optionally, the pulse width modulation duty cycle is obtained from a look-up table to effect a substantially consistent motor voltage despite fluctuations in the battery voltage.

Preferably the battery voltage is monitored or measured and the duty cycle is controlled to maintain a consistent motor voltage.

The method can be utilized with a wide variety of devices, including mobile cellular phones, tablets, so-called "smart watches", electronic bracelets, etc.

In a second preferred aspect, the invention relates to a controller for controlling a vibration motor for a mobile communication device, the mobile communication device powered by a battery having a maximum charge voltage and a minimum charge voltage, the controller comprising electronics configured for monitoring the available voltage at the battery, and for driving the vibration motor using pulse width modulation with a motor voltage which is less than the minimum charge voltage of the battery and which is operative for controlling the pulse width modulation used to drive the vibration motor in a manner to provide a substantially consistent power level despite fluctuations in voltage of the battery.

In a third preferred aspect, the present invention relates to an improvement in a portable electronic device of the type having a vibration motor for creating a vibration in the portable electronic device as a means of communicating some condition to a user of the device, the portable electronic device being of the type powered by a battery having a maximum charge voltage and a minimum charge voltage, the improvement therein comprising that the available battery voltage at the battery is monitored and the voltage delivered to the vibration motor is delivered thereto using pulse width modulation to provide a motor voltage which is less than the minimum charge voltage of the battery and wherein the pulse width modulation is controlled to drive the vibration motor in a manner to provide a substantially consistent power level to the vibration motor despite fluctuations in battery voltage.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

FIG. 1A is a schematic diagram of a PWM control signal of the PWM controller of FIG. 1.

FIG. 2A is a schematic diagram of a PWM control signal of the PWM controller of FIG. 2.

FIG. 3A is a schematic diagram of a PWM control signal of the PWM controller of FIG. 3.

DETAILED DESCRIPTION OF EXAMPLE EMBODIMENTS

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
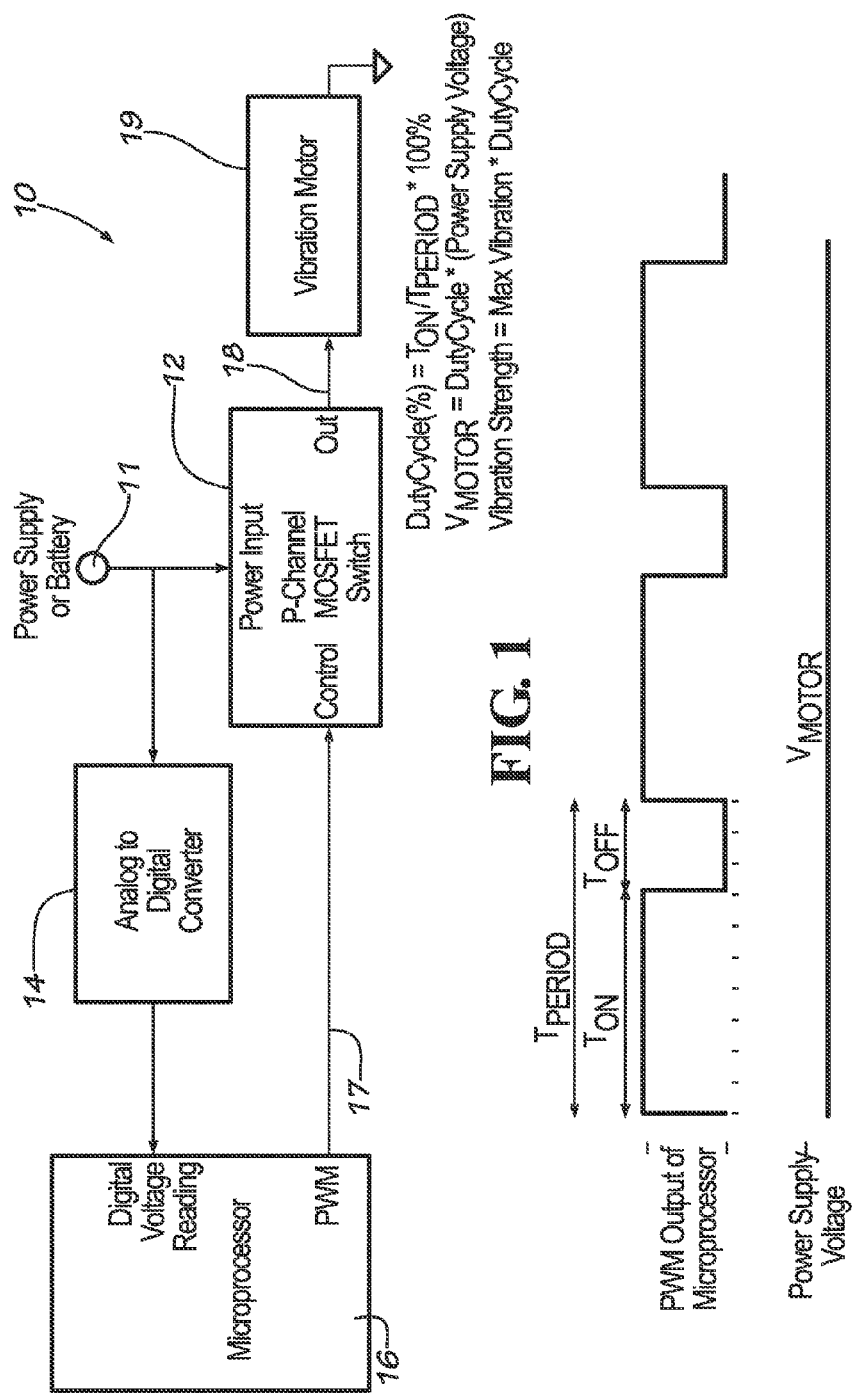
FIG. 1 is a schematic block diagram of a PWM controller for controlling operation of a vibration motor for use in a mobile electronic device, according to a first example embodiment of the present invention.

With reference now to the drawing figures, wherein like reference numbers represent corresponding parts throughout the several views, FIG. 1 shows a schematic block diagram of a PWM controller for controlling operation of a vibration motor for use in a mobile electronic device, according to a first example embodiment of the present invention. In this example, pulse width modulation control of the vibration (vibratory) motor is effected through a P-channel MOSFET switch. The control circuitry 10 includes a power supply or battery 11 coupled to both the P-channel MOSFET switch 12 and an A-to-D (analog to digital) converter 14. Output from the A-to-D converter 14 is coupled to a microprocessor 16 to provide the microprocessor with a signal representing the voltage of the battery or power supply (noted on the diagram as "Digital Voltage Reading"). The microprocessor 16 is provided with software or firmware (programming) to effect pulse width modulation control and a PWM output signal is outputted on line 17 to the P-channel MOSFET switch 12, which in turn provides input signal on line 18 to the vibration motor 19. In this example, the MOSFET switch is used to modulate the input signal to the vibration motor. Operation of the PWM control is schematically depicted in FIG. 1A.

Figure 2:
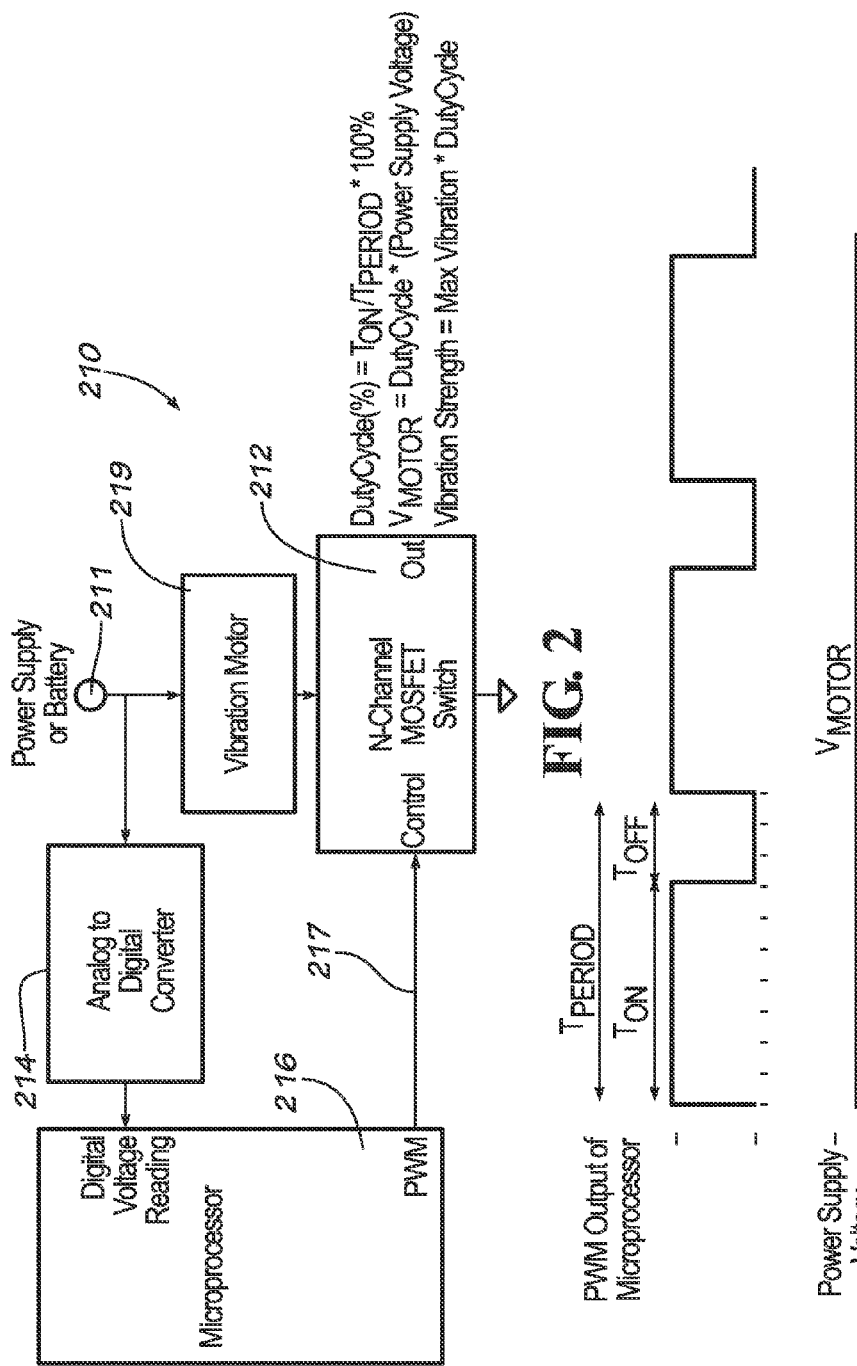
FIG. 2 is a schematic block diagram of a PWM controller for controlling operation of a vibration motor for use in a mobile electronic device, according to a second example embodiment of the present invention.

FIG. 2 shows a schematic block diagram of a PWM controller for controlling operation of a vibration motor for use in a mobile electronic device, according to a second example embodiment of the present invention. In this example, pulse width modulation control of the vibration (vibratory) motor is effected through an N-channel MOSFET switch 212. The control circuitry 210 includes a power supply or battery 211 coupled to both the vibratory motor 219 and an A-to-D (analog to digital) converter 214. Output from the A-to-D converter 214 is coupled to a microprocessor 216 to provide the microprocessor with a signal representing the voltage of the battery or power supply (noted on the diagram as "Digital Voltage Reading"). The microprocessor 216 is provided with software or firmware (programming) to effect pulse width modulation control and a PWM output signal is outputted on line 217 to the N-channel MOSFET switch 212 as a control line for the N-channel MOSFET switch, which in turn provides input signal on line 18 to the vibration motor 219. In this example, the MOSFET switch 212 is used to modulate the ground path from the vibration motor to ground, thereby controlling the flow of power through the motor (and the voltage drop thereacross). Operation of the PWM control is schematically depicted in FIG. 2A.

Figure 3:
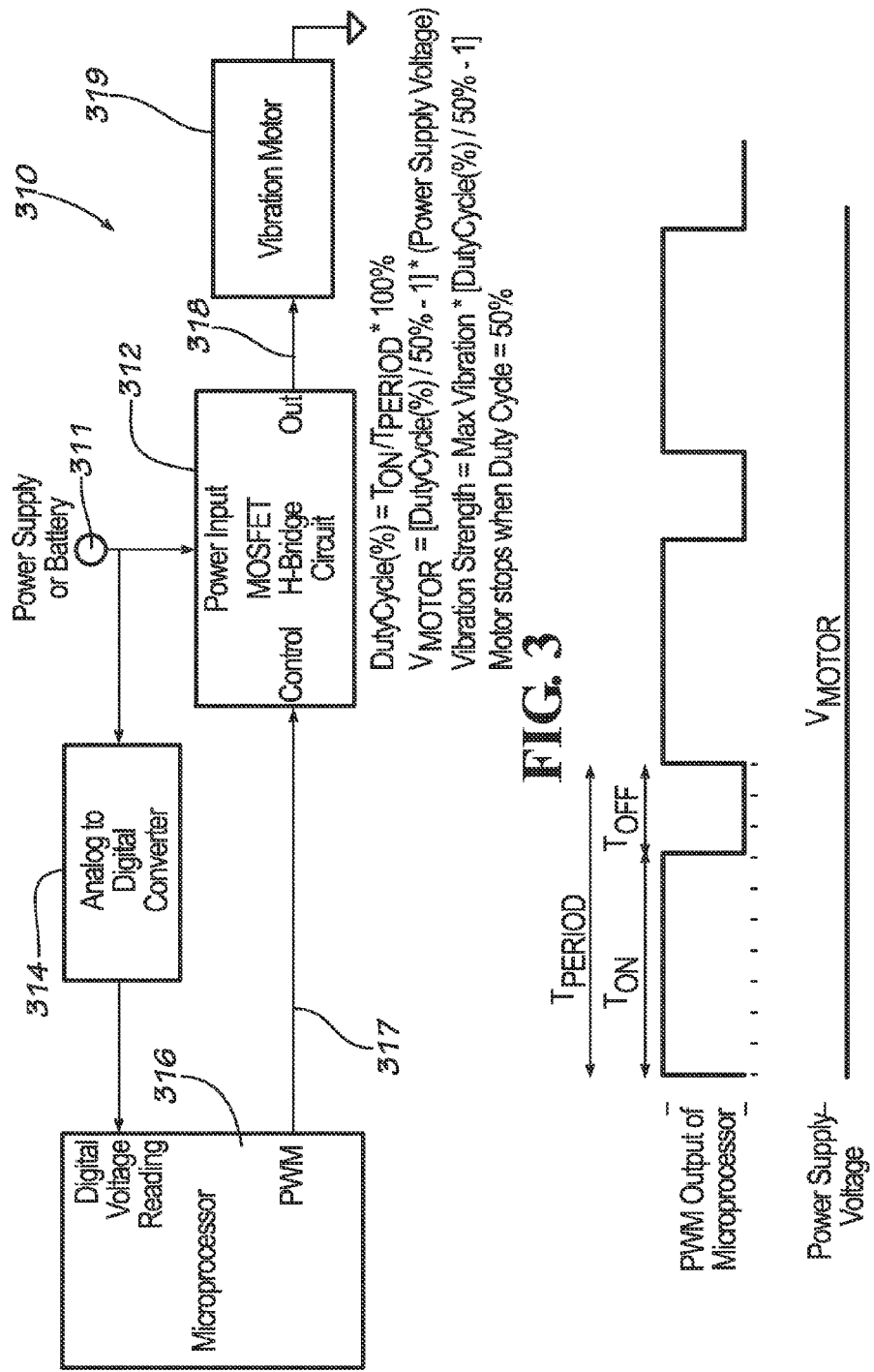
FIG. 3 is a schematic block diagram of a PWM controller for controlling operation of a vibration motor for use in a mobile electronic device, according to a third example embodiment of the present invention.

FIG. 3 shows a schematic block diagram of a PWM controller for controlling operation of a vibration motor for use in a mobile electronic device, according to a third example embodiment of the present invention. In this example, pulse width modulation control of the vibration (vibratory) motor is effected through a MOSFET switch with an H-bridge circuit. The control circuitry 310 includes a power supply or battery 311 coupled to both the MOSFET switch 312 and an A-to-D (analog to digital) converter 314. Output from the A-to-D converter 314 is coupled to a microprocessor 316 to provide the microprocessor with a signal representing the voltage of the battery or power supply (noted on the diagram as "Digital Voltage Reading"). The microprocessor 316 is provided with software or firmware (programming) to effect pulse width modulation control and a PWM output signal is outputted on line 317 to the P-channel MOSFET switch 312, which in turn provides input signal on line 318 to the vibration motor 19. In this example, the MOSFET switch is used to modulate the input signal to the vibration motor. The principal difference between the MOSFET switch 12 of FIG. 1 and the MOSFET switch 312 of FIG. 3 lies in that the H-bridge involves multiple switches instead of only one as in FIG. 1. So instead of just allowing power through whenever the PWM signal is high, the H-bridge allows some control over the direction of the motor. With the H-bridge, one can start the motor and then quickly reverse the motion to apply essentially a brake to make the vibration feel cleaner, instead of simply permitting the motor to slow to a stop. Optionally, one can use a chip that has a built-in H-bridge so that one can produce special effects, such as different rotational speeds and quick stops that one typically cannot achieve with a single MOSFET. Thus, one can add the options of controlling direction of rotation and braking during rotation.

Operation of the PWM control is schematically depicted in FIG. 3A.

Thus, FIGS. 1, 2 and 3 depict three methods of controlling a vibration motor through PWM control, and depict control of the PWM motor voltage based upon the power supply voltage. The motor voltage is largely dependent on two factors:

power supply voltage or battery voltage; and PWM Settings. For example, when the battery voltage is 4.2V, the motor voltage and thus vibration strength is X. When the battery voltage drops to 3.6V, the motor voltage and thus vibration strength is: Vibration Strength=X*3.6/4.2, or a 14.28% drop from the 4.2V motor voltage case.

For example, in one typical application, a Lithium-Ion battery has a voltage which varies between a full charge voltage of 4.2V, down to 3.6V when nearly "empty". When used to drive a vibration motor, typically one would choose the highest battery voltage so as not to damage the motor. However, using the highest voltage setting when the battery voltage is at 3.6V degrades the motor vibration. Also, due to the output impedance of the battery, the battery voltage drops when loaded with the motor load. The motor vibration is directly related to the battery voltage with and without the load of the motor applied. The present invention involves reading (monitoring) the battery voltage and controlling the motor voltage, before and/or during the motor vibration sequence, to normalize the vibration regardless of the battery voltage, thus presenting a consistent vibration feel to the user.

In one aspect, the invention involves the following steps:
a. Designing the product to allow the microprocessor to read the voltage used to power the vibration motor.
b. Selecting the vibration motor to have a maximum operating voltage well below the minimum supply voltage.
c. Selecting a microprocessor that allows a PWM (Pulse Width Modulation) output of sufficient frequency and steps to provide the desired voltages to the vibration motor.
d. Designing the microprocessor firmware to read the power supply or battery voltage before powering the vibration motor, for the purpose of adjusting the vibration profile PWM settings to provide a consistent vibration sensation, either by lookup table or formula.

A Pulse Width Modulated signal is a type of digital waveform. It alternates between bursts of 'On' and 'Off, also known as high and low respectively, (typically) at a fixed frequency. The PWM signal differs from other digital signals (e.g. square waves) in that the time that the signal is high and low can be varied. This is useful because when the PWM signal is averaged with a simple low pass analogue filter, a DC voltage is obtained that is proportional to the duty cycle (which is the percentage of time that the PWM signal is high). Since a vibration motor's speed and frequency of vibration is directly proportional to the voltage applied to the motor, PWM can be used to control how the motor runs rather precisely. Because of the inductive and resistive nature of a DC motor's windings, it effectively has its own low pass analogue filter built in.

Optionally, the specified frequency of the signal is sufficiently high so that the vibration motor does not see 'bursts' of high and low (the switching digital signal). Instead, preferably the PWM signal is caused to appear as a smooth averaged signal, which is proportional to the duty cycle of the digital signal.

Figures 4, 4A:
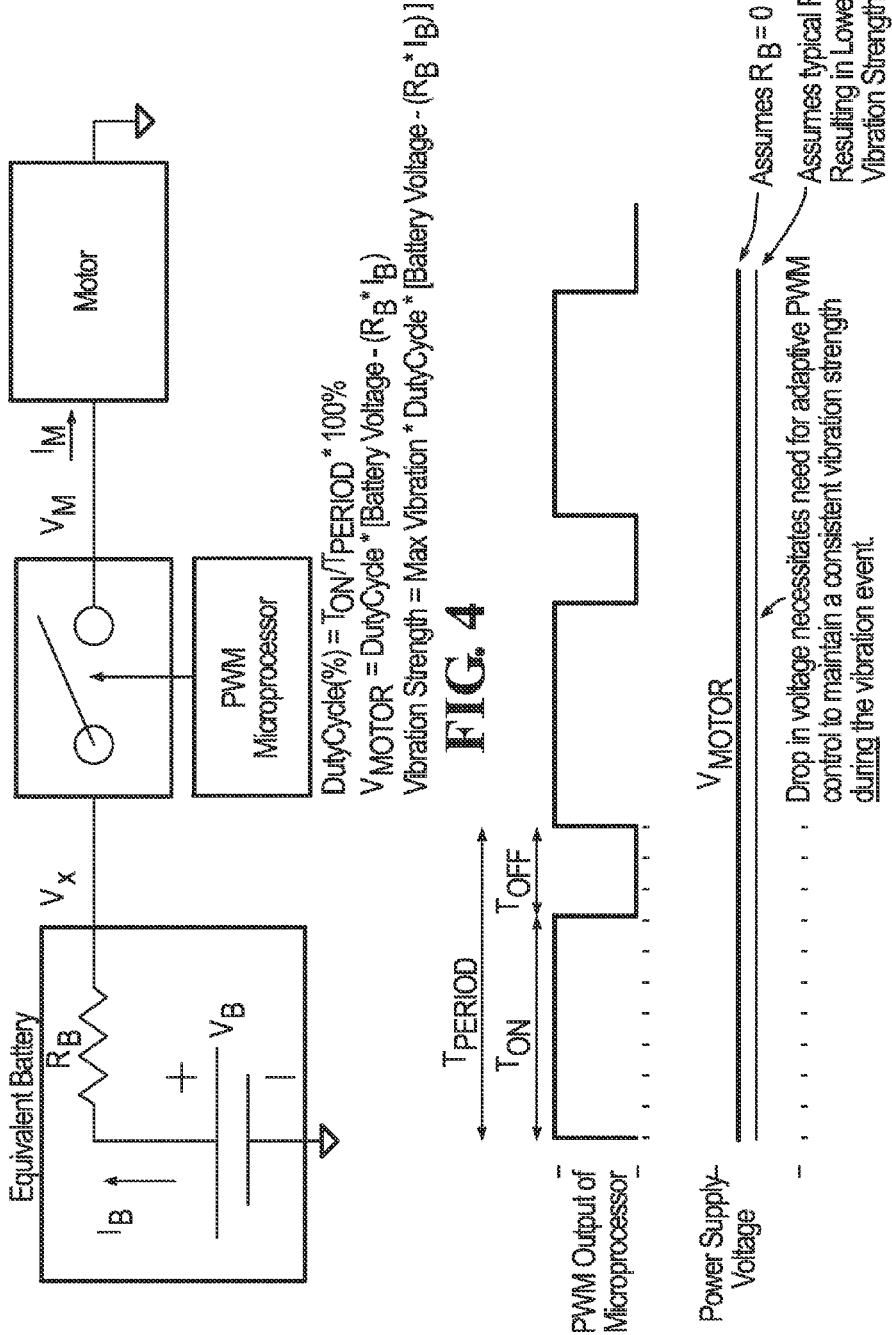
FIG. 4 is a schematic block diagram of a PWM controller for controlling operation of a vibration motor for use in a mobile electronic device, according to a fourth example embodiment of the present invention.

FIG. 4 depicts an adaptive feedback control of the PWM settings. Due to the inherent output resistance of the battery, shown as RB, the true battery voltage during a vibration event is much less than the battery voltage during an unloaded condition. For example, when the battery voltage is 4.2V, the motor voltage and thus vibration strength is X. When the battery voltage drops to 2.5V due to the current drain of the motor causing a voltage drop through RB, the motor voltage and thus vibration strength is: Vibration Strength=X*2.5/4.2, or a 40% drop from the 4.2V motor voltage case.

Figure 5:
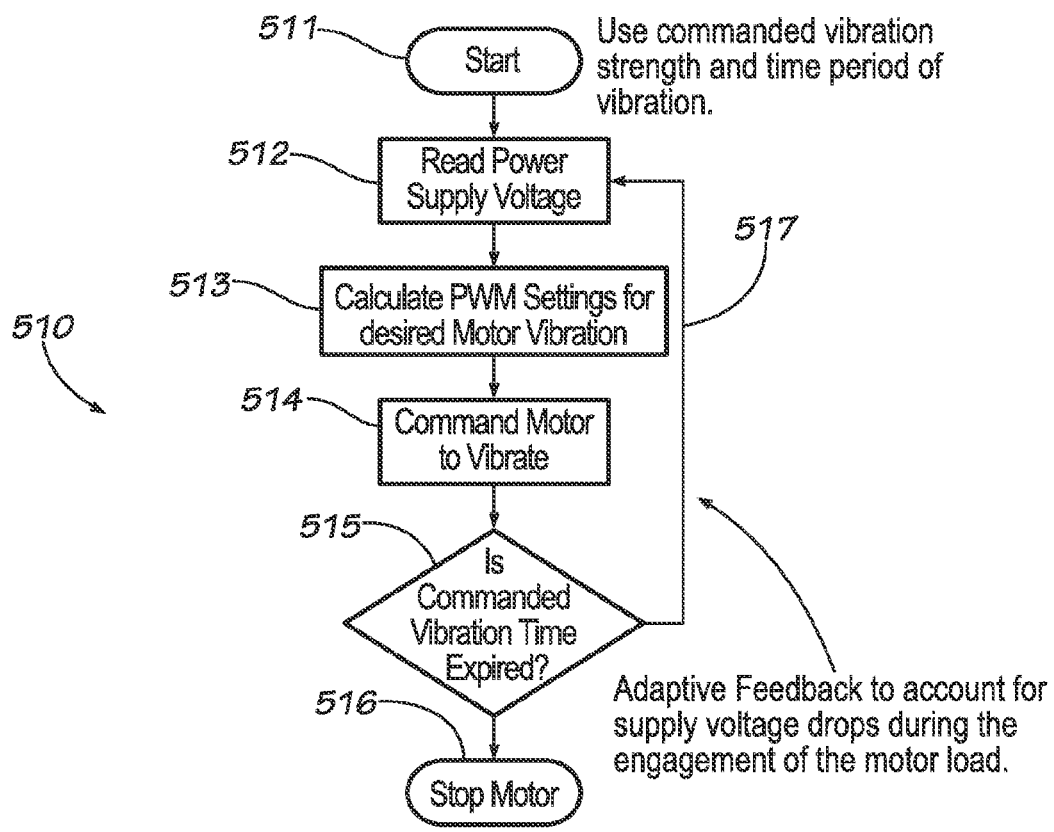
FIG. 5 is a schematic flow chart diagram of a PWM control method for controlling operation of a vibration motor for use in a mobile electronic device, according to a fifth example embodiment of the present invention.

FIG. 5 depicts a firmware flowchart for an adaptive feedback control algorithm 510 according to one aspect of the present invention. Beginning from a starting step 511, the next step 512 is to read the battery/power supply voltage. Then at step 513 one calculates (or looks up in a stored lookup table) the PWM settings for effecting a desired vibration in the vibration motor. At step 514 one sends the PWM voltage signal to the vibration motor to cause the motor to vibrate. Next, at decision step 515, one checks to see if a timer has expired. If so, the decision branches to the end step at 516. If not, the decision branches back along path 517 to step 512.

As described above and as shown herein, the present invention provides an improved vibration motor control so as to maintain a substantially consistent vibration over time, despite decreasing battery voltage over time.

In a first preferred aspect, the invention relates to a method for controlling a vibration motor for a mobile communication device, the mobile communication device powered by a battery having a maximum charge voltage and a minimum charge voltage, the method comprising the steps of: monitoring the available voltage at the battery; driving the vibration motor using pulse width modulation with a motor voltage which is less than the minimum charge voltage of the battery; and controlling the pulse width modulation used to drive the vibration motor in a manner to provide a substantially consistent power level despite fluctuations in voltage of the battery.

Preferably, the vibration motor is chosen to have a motor voltage which is substantially less than the minimum charge voltage of the battery. Also preferably, the motor voltage is applied by using pulse width modulation to reduce the battery voltage to the required motor voltage.

Optionally, the step of applying the pulse width modulation to reduce the battery voltage is carried out according to the following formula: Duty Cyle=Vm÷Vb, where Vm is the motor voltage, Vb is the present battery voltage, and Duty Cycle is the duty cycle of the pulse width modulation. Optionally, the pulse width modulation duty cycle is obtained from a look-up table to effect a substantially consistent motor voltage despite fluctuations in the battery voltage.

Preferably the battery voltage is monitored or measured and the duty cycle is controlled to maintain a consistent motor voltage.

The method can be utilized with a wide variety of devices, including mobile cellular phones, tablets, so-called "smart watches", electronic bracelets, etc.

In a second preferred aspect, the invention relates to a controller for controlling a vibration motor for a mobile communication device, the mobile communication device powered by a battery having a maximum charge voltage and a minimum charge voltage, the controller comprising electronics configured for monitoring the available voltage at the battery, and for driving the vibration motor using pulse width modulation with a motor voltage which is less than the minimum charge voltage of the battery and which is operative for controlling the pulse width modulation used to drive the vibration motor in a manner to provide a substantially consistent power level despite fluctuations in voltage of the battery.

In a third preferred aspect, the present invention relates to an improvement in a portable electronic device of the type having a vibration motor for creating a vibration in the portable electronic device as a means of communicating some condition to a user of the device, the portable electronic device being of the type powered by a battery having a maximum charge voltage and a minimum charge voltage, the improvement therein comprising that the available battery voltage at the battery is monitored and the voltage delivered to the vibration motor is delivered thereto using pulse width modulation to provide a motor voltage which is less than the minimum charge voltage of the battery and wherein the pulse width modulation is controlled to drive the vibration motor in a manner to provide a substantially consistent power level to the vibration motor despite fluctuations in battery voltage.

While the invention has been described with reference to preferred and example embodiments, it will be understood by those skilled in the art that a variety of modifications, additions and deletions are within the scope of the invention, as defined by the following claims.

What is claimed is:

1. A method for controlling a vibration motor for a mobile communication device, the mobile communication device powered by a battery having a maximum charge voltage and a minimum charge voltage, the method comprising the steps of:
   monitoring the available voltage at the battery;
   driving the vibration motor using pulse width modulation with a motor voltage which is less than the minimum charge voltage of the battery; and
   controlling the pulse width modulation used to drive the vibration motor in a manner to provide a substantially consistent power level despite fluctuations in voltage of the battery;
wherein the vibration motor is chosen to have a motor voltage which is substantially less than the minimum charge voltage of the battery.

2. The method as claimed in claim 1 wherein the motor voltage is applied by using pulse width modulation to reduce the battery voltage to the required motor voltage.

3. The method as claimed in claim 2 wherein the step of applying the pulse width modulation to reduce the battery voltage is carried out according to the following formula:

Duty Cycle=$Vm \div Vb$, where

Vm is the motor voltage, Vb is the present battery voltage, and Duty Cycle is the duty cycle of the pulse width modulation.

4. The method as claimed in claim 2 wherein the battery voltage is monitored and the duty cycle is controlled to maintain a consistent motor voltage.

5. The method as claimed in claim 2 wherein the battery voltage is measured and the duty cycle is controlled to maintain a consistent motor voltage.

6. The method as claimed in claim 2 wherein pulse width modulation duty cycle is obtained from a look-up table to effect a substantially consistent motor voltage despite fluctuations in the battery voltage.

7. The method as claimed in claim 1 wherein mobile communication device is a cellular phone.

8. The method as claimed in claim 1 wherein mobile communication device is an electronic bracelet for use with a cellular phone.

9. The method as claimed in claim 1 wherein mobile communication device is an electronic bracelet for use with a cellular phone.

10. A controller for controlling a vibration motor for a mobile communication device, the mobile communication device powered by a battery having a maximum charge voltage and a minimum charge voltage, the controller comprising electronics configured for monitoring the available voltage at the battery, and for driving the vibration motor using pulse width modulation with a motor voltage which is less than the minimum charge voltage of the battery and which is operative for controlling the pulse width modulation used to drive the vibration motor in a manner to provide a substantially consistent power level despite fluctuations in voltage of the battery; wherein the vibration motor is chosen to have a motor voltage which is substantially less than the minimum charge voltage of the battery.

11. The method as claimed in claim 10 wherein the motor voltage is applied by using pulse width modulation to reduce the battery voltage to the required motor voltage.

12. The method as claimed in claim 11 wherein the step of applying the pulse width modulation to reduce the battery voltage is carried out according to the following formula:

Duty Cycle=$Vm \div Vb$, where

Vm is the motor voltage, Vb is the present battery voltage, and Duty Cycle is the duty cycle of the pulse width modulation.

13. The controller as claimed in claim 11 wherein the battery voltage is monitored and the duty cycle is controlled to maintain a consistent motor voltage.

14. The controller as claimed in claim 11 wherein pulse width modulation duty cycle is obtained from a look-up table to effect a substantially consistent motor voltage despite fluctuations in the battery voltage.

15. An improvement in a portable electronic device of the type having a vibration motor for creating a vibration in the portable electronic device as a means of communicating some condition to a user of the device, the portable electronic device being of the type powered by a battery having a maximum charge voltage and a minimum charge voltage, the improvement therein comprising that the available battery voltage at the battery is monitored and the voltage delivered to the vibration motor is delivered thereto using pulse width modulation to provide a motor voltage which is less than the minimum charge voltage of the battery and wherein the pulse width modulation is controlled to drive the vibration motor in a manner to provide a substantially consistent power level to the vibration motor despite fluctuations in battery voltage; wherein the vibration motor is chosen to have a motor voltage which is substantially less than the minimum charge voltage of the battery.

\* \* \* \* \*